March 19, 1963   F. P. SCULLY   3,081,789
SIGNALING AND VENTING UNIT FOR USE IN FILLING TANKS
Filed Oct. 14, 1960   3 Sheets-Sheet 1

Frank P. Scully
INVENTOR
BY Porter, Chittick, Russell & Pfund
ATTORNEYS

March 19, 1963  F. P. SCULLY  3,081,789
SIGNALING AND VENTING UNIT FOR USE IN FILLING TANKS
Filed Oct. 14, 1960  3 Sheets-Sheet 2

Frank P. Scully
INVENTOR
BY Porter, Chittick, Russell & Pfund
ATTORNEYS

March 19, 1963 F. P. SCULLY 3,081,789
SIGNALING AND VENTING UNIT FOR USE IN FILLING TANKS
Filed Oct. 14, 1960 3 Sheets-Sheet 3
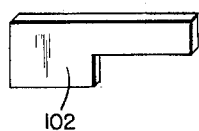
FIG. 10
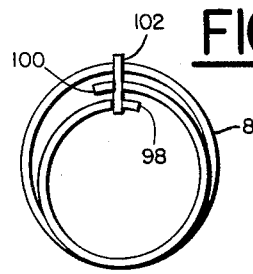
FIG. 11
FIG. 8
FIG. 9
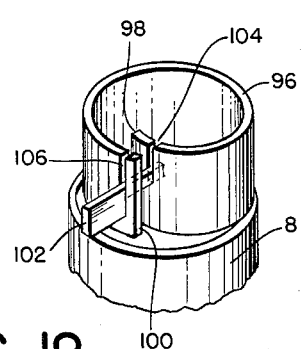
FIG. 12
Frank P. Scully
INVENTOR
BY Porter, Chittick, Russell & Pfund
ATTORNEYS

United States Patent Office 3,081,789
Patented Mar. 19, 1963

3,081,789
SIGNALING AND VENTING UNIT FOR USE IN FILLING TANKS
Frank P. Scully, Belmont, Mass., assignor to Scully Signal Company, Melrose, Mass., a corporation of Massachusetts
Filed Oct. 14, 1960, Ser. No. 62,732
7 Claims. (Cl. 137—238)

This invention relates to a mechanism used in connection with the filling of a closed tank with liquid. The invention, in particular, is a signaling and venting unit which is affixed in the upper part of the tank in series with the vent pipe. During filling of the tank, the unit produces an audible signal which continues until the liquid rises to a predetermined level, at which level the signal audibly changes so that the operator is advised to shut off the entering supply of liquid. The selected level is usually that at which the tank will be substantially full.

Signaling devices of this general character have been known in the art for a long time. An early form is shown in the patent to Mathey, 2,135,522. In the following explanation of the invention, it will be described in relation to a conventional 275-gallon tank of the type commonly in use in households for holding fuel oil for oil burner use. Such tanks typically have at least three openings in the top: one opening which is connected to the fill pipe, a second opening in which may be inserted a liquid level gauge, and a third opening to which is connected the vent pipe. As the tank is filled by oil entering the tank through the fill pipe, the rising level drives the displaced gas out through the vent pipe. In so doing, the gas passes through the whistle or signaling device to produce an audible signal. When the liquid level rises to trap the lower end of the intrusion tube which depends from the whistle (or traps the whistle itself if no intrusion tube is used), flow of gas through the whistle stops so that the whistling sound is discontinued, thus advising the operator that the liquid level has risen to at least the lower end of the intrusion tube. The remaining space at the top of the tank gives the operator an adequate opportunity to shut off the supply of oil.

The present invention may be installed in the tank in series with the vent pipe in various ways. In existing situations, it may be installed from the outside of the tank by first cutting off a suitable length of the vent pipe adjacent the tank, screwing the unit into the tank through the vent opening and then attaching the lower end of the vent pipe to the upper part of the signaling unit.

In new installations, the unit may be screwed into the tank from the outside and the vent pipe, initially cut to the proper length, is then connected to the upper end of the unit. Alternatively, the unit may be first secured to the lower end of the vent pipe by means engaging the vent pipe interior. The unit is inserted into the tank through the vent opening while attached to the vent pipe. The vent pipe is then secured in any convenient manner to the tank.

In old existing tanks where it is preferred that the vent pipe remain undisturbed, the signaling unit may be installed by introducing it into the tank through one of the other tank openings, preferably through the gauge unit opening from which the gauge has been temporarily removed. When the unit is installed in the latter manner, means is provided for automatically effecting secure frictional engagement between the unit and the vent pipe so that the unit will remain properly in place for subsequent long continued operation.

The unit includes as essential features thereof an audible signaling device which is preferably in the form of the conventional button type whistle, an intrusion tube (if desired) depending from the whistle, the length of the intrusion tube being determined by the level at which it is desired to give the signal, and pressure relief means located in the body of the unit which opens whenever the pressure in the tank exceeds a predetermined degree so that additional gas may flow therethrough to the vent pipe. The relief means also provides a passage for fluid should the fluid rise to that level.

Another object of the invention is to provide a construction which insures that the whistle will not become blocked or inoperative during its normal life. Units of this type when once installed are completely inaccessible, and whistle failure could result in serious consequences. Experience has shown that foreign matter comprising insects and other debris from time to time enter the vent pipe, ultimately to fall down on top of the whistle. In time, the whistle passage may become blocked by such material. Accordingly, to prevent this, I provide a screen above the upper surface of the whistle which effectively prevents such foreign matter from entering the resonance chamber of the whistle. Additionally, I have provided a novel mechanism for removing such foreign matter from its position above the whistle screen. This is accomplished by having clean-out ports located just above the whistle. These ports are normally closed by pressure actuated closure elements which upon the application of adequate gas pressure to the vent pipe, will be forced outwardly from the whistle housing. The gas entering the tank through the vent pipe and housing will blow the foreign matter from its position above the whistle through the clean-out ports into the tank. This material then settles to the bottom of the tank.

These and other objects of the invention will become more apparent as the description proceeds with the aid of the accompanying drawings in which:

FIG. 8 is a side elevation of the construction shown in FIG. 1 except that alternative means is used to attach the unit to the vent pipe;

FIG. 9 is a view similar to FIG. 8 but looking from the right, showing the unit held in frictional engagement with the end of the vent pipe;

FIG. 10 is a detailed view of the pin element used to hold the friction means of FIG. 9 in constricted position;

FIG. 11 is a plan view of the upper end of FIG. 8 with the friction means in constricted position;

FIG. 12 is a perspective view of the upper end of FIG. 8;

Figure 1:
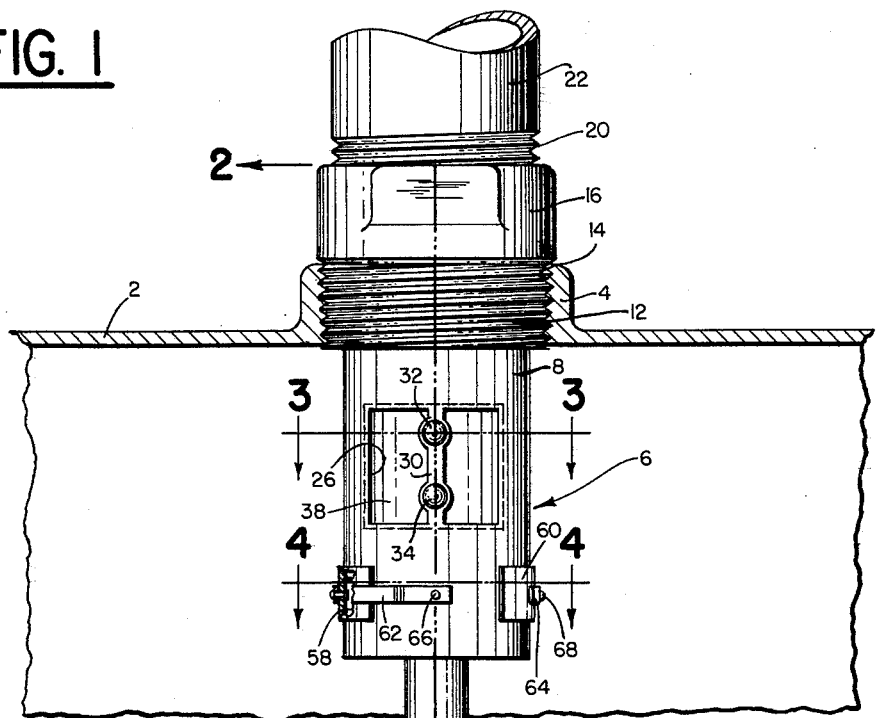
FIG. 1 shows the invention installed in a tank at the vent opening.
Figure 2:
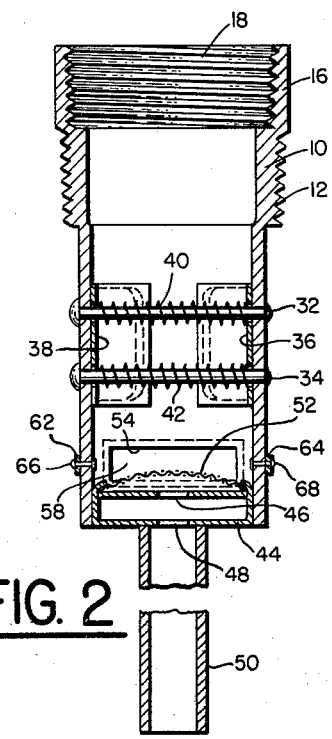
FIG. 2 is a vertical section taken on the line 2—2 of FIG. 1.
Figure 3:
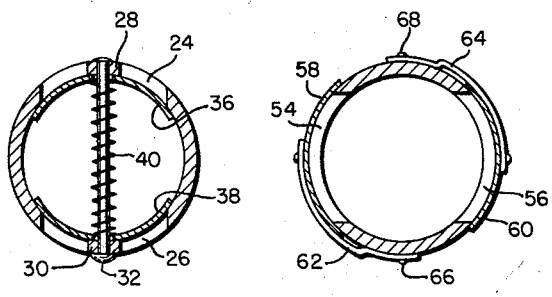
FIG. 3 is a horizontal section taken on the line 3—3 of FIG. 1.
Figure 4:
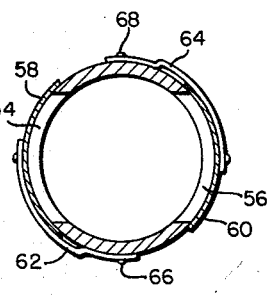
FIG. 4 is a horizontal section taken on the line 4—4 of FIG. 1.

Referring first to FIGS. 1 to 4, there is shown a tank 2, having thereon a threaded boss 4 which has in screw threaded engagement therewith the signaling and venting unit generally referred to at 6. The unit comprises a cylindrical housing 8 which terminates at its upper end in a neck 10 threaded at 12, which threads cooperate with the threads 14 in the boss 4. A further upwardly extending cylindrical portion 16 is internally threaded at 18 to receive the threads 20 on the lower end of vent pipe 22.

The housing 8 has two oppositely disposed openings 24 and 26, the openings being divided by vertically extending bars 28 and 30, which bars support a pair of transversely extending pins 32 and 34. Openings 24 and 26 are normally closed by curved valves 36 and 38 which are held in the position shown in FIGS. 2 and 3 by the springs 40 and 42.

At the lower end of housing 8 is a conventional button type whistle 44 having upper and lower openings 46 and 48. An intrusion tube 50 (if used) is cut to selected length, is in series with the whistle openings, and depends from the lower face of the whistle.

An arched screen 52 preferably covers the upper face of the whistle to prevent foreign matter from entering the resonance chamber or clogging the whistle openings.

Immediately above the whistle and at opposite sides of the housing 8 are two clean-out valves. These comprise passages 54 and 56 covered by curved plate closures 58 and 60, which closures are held in position by leaf springs 62 and 64, the springs being secured to the body at 66 and 68.

From the above description, it will be seen that the valves 36 and 38 will open inwardly under conditions of increased pressure in the tank to allow some of the gas to bypass the whistle, thereby providing greater venting capacity, and to provide a passage for liquid to the vent pipe if the level reaches the valve. On the other hand, the cleanout closures 58 and 60, which open outwardly, open only when the pressure within the housing 8 exceeds the pressure in the tank by a predetermined degree.

The operation of the unit above described is as follows: As the tank is being filled, gas passes upwardly through the intrusion tube 50 and thence through the whistle 44 and out to the atmosphere through vent pipe 22. A whistling sound is thus produced, indicating to the operator that the liquid has not as yet reached the lower end 70 of the intrusion tube 50. When the liquid does reach lower end 70 to trap the tube, further flow of gas through the whistle 44 is prevented so the whistling sound ceases, apprizing the operator of the level of the liquid in the tank. This gives him adequate opportunity to shut off the supply.

Pressure above a predetermined degree in the upper part of the tank will cause the valves 36 and 38 to move inwardly so that additional venting capacity will then be present. This will prevent the development of a tank pressure which might adversely affect the proper operation of the whistle. If the liquid supply is allowed to continue, overflow will occur by the liquid passing to the vent pipe through both the whistle passage and the larger relief passages 24 and 26.

The clean-out valves 58 and 60 are caused to function in the following manner: When necessary or advisable, the outer discharge end of the vent pipe may be connected to a source of adequate air pressure. This compressed air, on admission to the vent pipe 22, will cause outward movement of plates 58 and 60 and a sufficient blast of air will flow through the passages 54 and 56 to carry with it any foreign matter which may at that time be resting on the screen 52. In this way, the bottom of the housing 8 is quickly and easily cleaned out.

Figure 5:
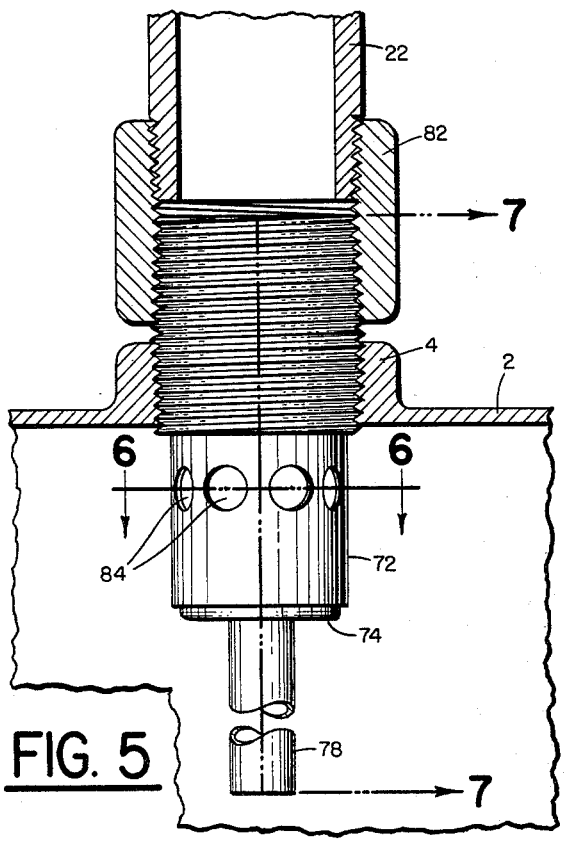
FIG. 5 shows a modified form of the invention.
Figure 7:
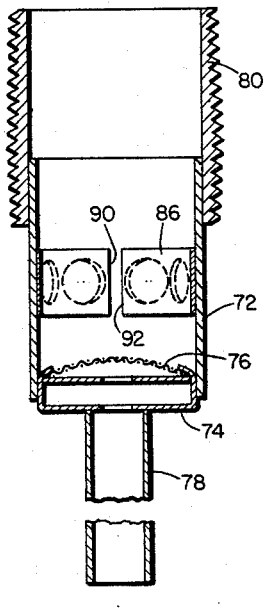
FIG. 7 is a vertical section taken on the line 7—7 of FIG. 5.
Figure 6:
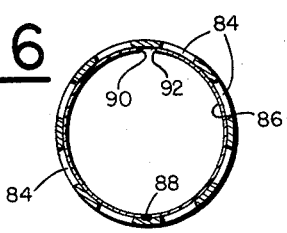
FIG. 6 is a horizontal section taken on the line 6—6 of FIG. 5.

A modified form of the invention is shown in FIGS. 5, 6 and 7. The housing of the signaling unit is indicated at 72, with the whistle 74 at the lower end. The whistle, as in FIGS. 1 to 4, is preferably covered with a screen 76 of known design, and the customary intrusion tube 78 (if used) depends from the whistle in series with the whistle openings.

The upper part of body 72 is secured to a nipple 80 in any convenient manner, such as by soldering, welding, or by a tight pressed fit as shown. Nipple 80 makes screw threaded engagement with boss 4 of tank 2. A coupling 82 connects nipple 80 to the vent pipe 22.

The relief mechanism of body 72 is constructed in the following manner: A plurality of holes 84 extend circumferentially about housing 72. These holes are covered on their inside by a thin cylindrical strip of spring material 86, which strip is secured to the housing at its mid-point 88 with its ends at 90 and 92. When the tank pressure exceeds a predetermined degree, the strip 86 is forced inwardly away from the openings 84 to provide the additional venting capacity required. Cleanout valves are not shown in the housing 72 of FIGS. 5 and 7, but it will be understood that if desired the cleanout valve construction shown in FIGS. 1, 2, 4, 8 and 9 could be included in housing 72 below relief strip 86 and whistle 74.

The constructions shown in FIGS. 1 and 5 are inserted from the tank exterior through the boss 4. Other forms will now be shown in which the signaling unit may be either initially secured to the vent pipe and inserted into the tank while so attached or may be positioned in the vent pipe from the interior of the tank.

Referring to FIGS. 8 to 12, the signaling and venting means is the same as that shown in FIG. 1. The difference, however, resides in the means whereby the unit 6 is retained in position at the lower end of the vent pipe. In this case, the unit 6 has connected to it over the short circumferential area 94 a spring band 96 which is split on the opposite side with its ends at 98 and 100. This band is held in a constricted condition of reduced diameter by means of a pin 102 which resides in slots 104 and 106 as shown most plainly in FIG. 12.

This construction in new installations may be frictionally attached to vent pipe 22 by removing pin 102 after introducing the upper part of band 96 into vent pipe 22 to allow band 96 to expand into engagement with the interior lower end of the vent pipe. The unit 6 is then lowered into the tank and the lower end of the vent pipe screwed to the tank, as in FIG. 9.

When positioned in the vent pipe from the tank interior, the following procedure is followed: By means of a tool (not shown), the unit is lowered into the tank through one of the other tank openings, preferably the gauge opening, and is then swung by the tool upwardly into position under the lower end of vent pipe 22 to assume the position shown in FIG. 9. As the friction band 96 is moved upwardly into the lower end of vent pipe 22, the finger 102, by engagement with the end of vent pipe 22, is readily dislodged from the slot 104 so that the ends 98 and 100 of the band 96 instantly snap outwardly to frictionally engage the interior lower surface of vent pipe 22, thus holding unit 6 in position, as shown in FIG. 9. Since the upper edge of housing 8 fits closely against the lower end of vent pipe 22, the performance of the unit 6, when mounted as in FIG. 9, will be the same as that of the unit when mounted as in FIG. 1.

Figure 14:
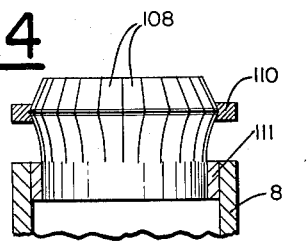
FIG. 14 shows the means whereby the flexible fingers are held in a position of reduced circumference prior to insertion of the unit in the vent pipe.
Figure 13:
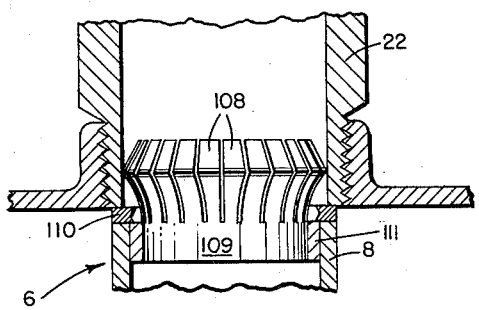
FIG. 13 shows other means for holding the signaling unit in the lower end of the vent pipe when insertion is made from the tank interior.

Another construction in which the unit 6 is secured to the interior of the lower end of the vent pipe is shown in FIGS. 13 and 14. In this construction, the housing 8 has secured to the interior of its upper end a plurality of circumferentially disposed flexible fingers 108, which fingers, when pressing outwardly with their maximum spring effect, rest against and frictionally engage the interior of the lower end of vent pipe 22, as shown in FIG. 13, to hold the unit 6 in position. The fingers 108 may be readily made by slitting a thin walled tube 109 to produce the desired number of fingers and then bending the fingers to the shape shown. The lower end of tube 109 may be soldered to the interior of ring 111, which in turn is soldered, welded, or otherwise fastened to the upper end of housing 8.

To facilitate introduction of the fingers 108 into the vent pipe 22, it has been found convenient to hold the fingers in a condition of reduced circumference by means of a ring 110 notched on its interior to receive the widest parts of the fingers therein. The exterior diameter of this ring is small enough to permit it to be introduced through either the vent pipe opening or the gauge opening but is large enough so that when the upper ends of the fingers 108 are pushed upward into the lower end of vent pipe 22 the ring 110 will engage the lower end of vent pipe 22 to be forced downwardly from the wide parts of the fingers 108, as shown in FIG. 13, permitting the fingers to spring outwardly to make tight frictional engagement with the interior of the vent pipe.

Thus whether the signaling and venting unit is inserted in the vent opening from the exterior and mounted as illustratively shown in FIGS. 1, 5, 9 and 13, or is inserted from the interior to be mounted as shown in FIGS. 9 and 13, the performance of the unit is identical.

It is my intention to cover all changes and modifications of the examples of the invention herein chosen for purposes of the disclosure which do not constitute departures from the spirit and scope of the invention.

I claim:

1. A signaling and venting unit for use in filling tanks to a predetermined level, said unit comprising a tubular housing, a whistle associated with said housing and in series therewith, a plurality of venting ports through said housing and above the whistle, each of said ports normally closed by a movable valve, said valves maintained in normally closed position by spring means, the strength of said spring means being such that said valves will open inwardly of said housing upon the development of a predetermined pressure within said tank, a cleanout port through said housing located between said venting ports and the upper side of said whistle, means normally closing said cleanout port and openable when the interior housing pressure exceeds the tank pressure by a predetermined degree and means for connecting said housing in series with the vent passage of said tank.

2. A signaling and venting unit for use in filling tanks to a predetermined level as set forth in claim 1, said valves maintained against vertical dislodgment by a member extending transversely of said housing and through said valves.

3. A signaling and venting unit for use in filling tanks to a predetermined level as set forth in claim 2, the said spring means comprising a coil spring positioned on said transversely extending member, with the spring ends bearing outwardly against oppositely disposed valves.

4. A signaling and venting unit for use in filling tanks to a predetermined level as set forth in claim 1, the means for connecting the said housing to the tank comprising a circumferentially compressible element connected to said housing and expandible when in the lower end of said vent passage to make frictional engagement therewith.

5. A signaling and venting unit for use in filling tanks to a predetermined level as set forth in claim 1, said connecting means being circumferentially constrictable, means holding the connecting means in a condition of reduced circumference prior to insertion in said vent passage, and means for releasing said holding means from said connecting means, whereby said connecting means may expand into engagement with the interior of said vent passage.

6. A signaling and venting unit for use in filling tanks to a predetermined level, said unit comprising a tubular housing, a whistle associated with said housing and in series therewith, a plurality of venting ports through said housing and above the whistle, each of said ports normally closed by a movable valve, said valves maintained in normally closed position by spring means and adapted to open inwardly of said housing upon the development of sufficient pressure in said tank, a clean-out port through said housing located between said venting ports and the upper side of said whistle, said clean-out port normally closed by a closure on the exterior of said housing, said closure maintained in normally closed position by other spring means and adapted to open outwardly of said housing upon the development of sufficient pressure within said housing, and means for connecting said housing in series with the vent passage of said tank.

7. A signaling and venting unit for use in filling tanks to a predetermined level, said unit comprising a tubular housing, a whistle associated with said housing and in series therewith, a plurality of venting ports through said housing and above the whistle, each of said ports normally closed by an inwardly movable valve, said valves maintained in said normally closed positions by common spring means, and other spring means connected to the upper end of said housing for making frictional engagement with the interior of the lower end of the vent pipe of said tank.

References Cited in the file of this patent

UNITED STATES PATENTS

| | | |
|---|---|---|
| 165,119 | Prosser | June 29, 1875 |
| 2,135,522 | Mathey | Nov. 8, 1938 |
| 2,227,323 | Scully | Dec. 31, 1940 |
| 2,605,109 | Myers | July 29, 1952 |
| 2,611,387 | Legerski | Sept. 23, 1952 |